United States Patent
Ginawi et al.

(10) Patent No.: US 7,773,159 B2
(45) Date of Patent: Aug. 10, 2010

(54) SWITCHING SYSTEM FOR SIGNAL MONITORING AND SWITCH-BACK CONTROL

(75) Inventors: Ahmed Y. Ginawi, South Burlington, VT (US); Casey J. Grant, Hinesburg, VT (US); Christopher Ro, Williston, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 1213 days.

(21) Appl. No.: 11/276,130

(22) Filed: Feb. 15, 2006

(65) Prior Publication Data

US 2007/0188664 A1    Aug. 16, 2007

(51) Int. Cl.
*H04N 5/50* (2006.01)
*H04N 5/44* (2006.01)

(52) U.S. Cl. .............. 348/731; 348/732; 348/461; 348/465; 348/553; 348/563; 725/38; 725/42; 725/22; 725/40

(58) Field of Classification Search .......... 348/731, 348/732, 725, 729, 558, 553, 460, 461, 465, 348/473, 563; 725/36, 22, 42, 38, 32, 25, 725/40
See application file for complete search history.

(56) References Cited

U.S. PATENT DOCUMENTS 6,593,976 B1 * 7/2003 Lord .................. 348/731
7,400,364 B2 * 7/2008 Chen et al. ............ 348/731

* cited by examiner

*Primary Examiner*—David L Ometz
*Assistant Examiner*—Jean W Dësir
(74) *Attorney, Agent, or Firm*—W. Riyon Harding; Hoffman Warnick LLC

(57) ABSTRACT

Systems for switching a displayed signal for a display between a plurality of signals are disclosed. In one embodiment, the system includes a microcontroller; a chooser for choosing a primary signal from a plurality of program-variable signals at the microcontroller; a monitor tuner coupled to the microcontroller for tuning the primary signal during switching of the displayed signal from the primary signal to a secondary signal; a detector coupled to the monitor tuner and the microcontroller for detecting a predetermined condition in the primary signal; and a selector coupled to the microcontroller for switching the displayed signal from the secondary signal to the primary signal upon occurrence of the predetermined condition. A user can switch between signals such as television channels or other dedicated functions without the risk of missing a portion of the program material.

20 Claims, 3 Drawing Sheets

SWITCHING SYSTEM FOR SIGNAL MONITORING AND SWITCH-BACK CONTROL

BACKGROUND OF THE INVENTION

1. Technical Field

The invention relates generally to television channel signal control, and more particularly, to systems for television signal monitoring and switch-back control.

2. Background Art

Conventional television control systems do not provide a way for a user to detect when a desired television program returns from non-programming material after the user has switched to another channel. For example, when a commercial starts on a selected television program, a user oftentimes changes channels to one or more channels (channel surfing) to avoid the commercials. Where the television control system allows, a user may also play games, access a computer subsystem or change to any of a variety of other types of video signals. Unfortunately, current television control systems do not provide a way for the user to know when the desired television program returns from non-programming material. As a result, the user oftentimes misses parts of the program material. There is a need in the art for a solution to this situation.

SUMMARY OF THE INVENTION

Systems for switching a displayed signal for a display between a plurality of signals are disclosed. In one embodiment, the system includes a microcontroller; a chooser for choosing a primary signal from a plurality of program-variable signals at the microcontroller; a monitor tuner coupled to the microcontroller for tuning the primary signal during switching of the displayed signal from the primary signal to a secondary signal; a detector coupled to the monitor tuner and the microcontroller for detecting a predetermined condition in the primary signal; and a selector coupled to the microcontroller for switching the displayed signal from the secondary signal to the primary signal upon occurrence of the predetermined condition. A user can switch between signals such as television channels or other dedicated functions without the risk of missing a portion of the program material.

A first aspect of the invention provides a system for switching a displayed signal for a display between a plurality of signals, the system comprising: a microcontroller; a chooser for setting a primary signal from a plurality of program-variable signals; a monitor tuner coupled to the microcontroller for tuning the primary signal during switching of the displayed signal from the primary signal to a secondary signal; a detector coupled to the monitor tuner and the microcontroller for detecting a predetermined condition in the primary signal; and a selector coupled to the microcontroller for switching the displayed signal from the secondary signal to the primary signal upon occurrence of the predetermined condition.

A second aspect of the invention provides a system for switching a displayed signal for a display between a plurality of signals, the system comprising: a microcontroller; a chooser for choosing a signal as a primary television (TV) channel signal from a plurality of TV channel signals at the microcontroller, the primary TV channel signal carrying one of a program material and a non-program material; a monitor tuner coupled to the microcontroller for tuning the primary TV channel signal during switching of the displayed signal to a secondary signal in the case that the primary TV channel signal is carrying the non-program material; a detector coupled to the monitor tuner for detecting a return of the primary TV channel signal to the program material; and a selector coupled to the microcontroller for switching the displayed signal from the secondary signal to the primary TV channel signal upon return of the primary TV channel signal to the program material.

A third aspect of the invention provides a system for switching a displayed signal for a display between a plurality of signals, the system comprising: a microcontroller; a chooser for choosing a signal as a primary television (TV) channel signal from a plurality of TV channel signals at the microcontroller, the primary TV channel signal carrying one of a program material and a non-program material; a monitor tuner coupled to the microcontroller for tuning the primary TV channel signal during a period when a displayed signal is switched to a secondary signal in the case that the primary TV channel signal is carrying the non-program material; a primary tuner for tuning the primary television channel signal during a period when the displayed signal is not switched to the secondary signal; a detector coupled to the monitor tuner for detecting a return of the primary TV channel signal to the program material by at least one of the following: a change in an audio amplitude peak, a vertical blanking interval occurrence, a change in a video pixel average and a predetermined time lapse; and a selector coupled to the microcontroller for switching the displayed signal from the secondary signal to the primary TV channel signal upon return of the primary TV channel signal to the program material.

A fourth aspect of the invention provides a computer-readable medium that includes computer program code to enable a computer infrastructure to switch a displayed signal for a display between a plurality of signals, the computer-readable medium comprising computer program code for implementing the functions of the invention.

An fifth aspect of the invention provides a business method for switching a displayed signal for a display between a plurality of signals, the business method comprising managing a computer infrastructure that performs each of the functions of the invention; and receiving payment based on the managing step.

A sixth aspect of the invention provides a method of generating a system for switching a displayed signal for a display between a plurality of signals, the method comprising: obtaining a computer infrastructure; and deploying means for performing each of the functions of the invention to the computer infrastructure.

The illustrative aspects of the present invention are designed to solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

The following description will be made with regard to an application to a display control system. As used herein, a "display" may include any electronic device that represents information in visual form, e.g., television, liquid crystal display, plasma screen, etc. It should be recognized, however, that the teachings of the invention may also be applied to different settings such as audio.

Figure 1:
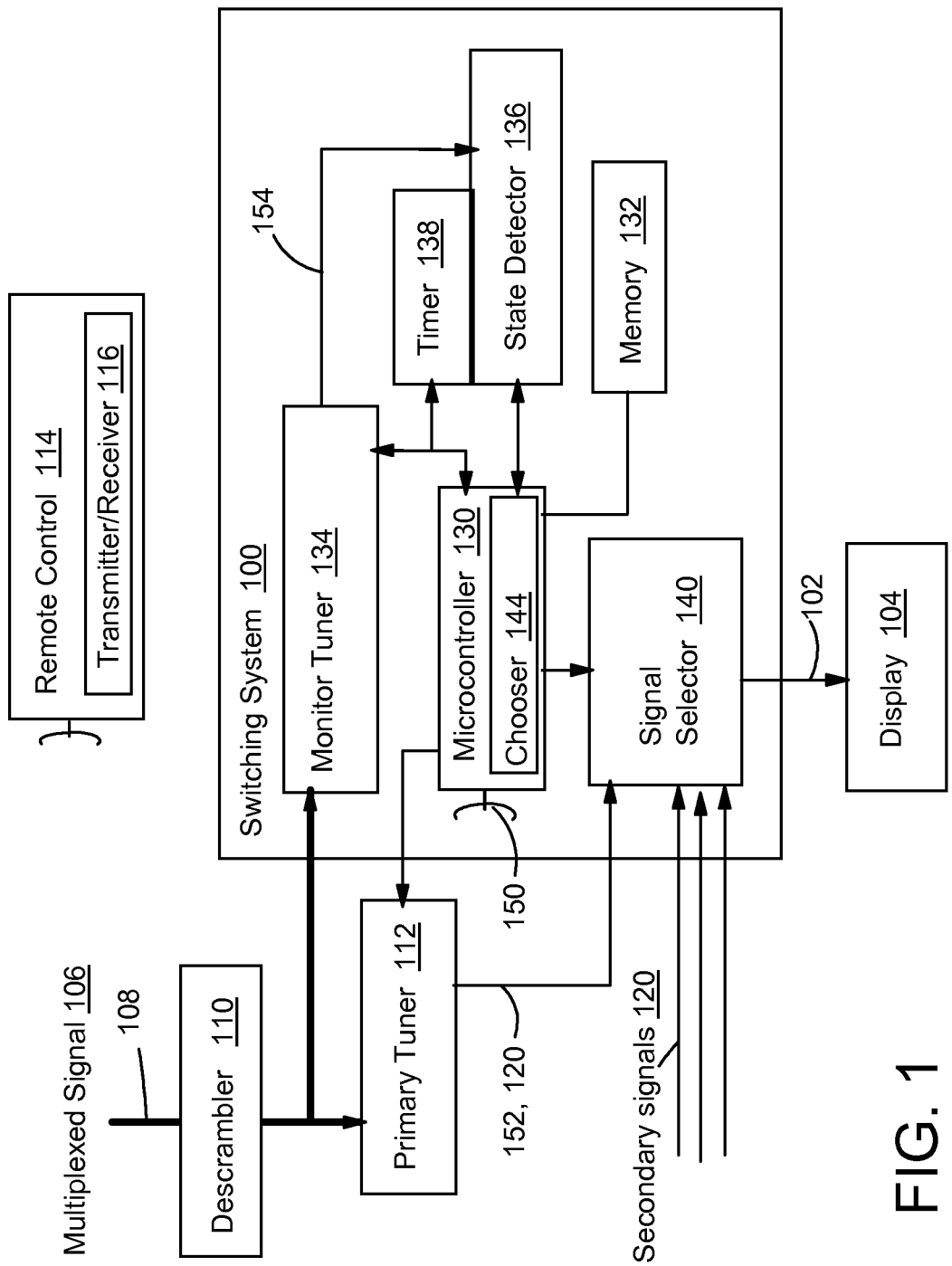
FIG. 1 shows a block diagram of a system according to one embodiment of the invention.

Turning to the drawings, FIG. 1 shows a block diagram of a switching system 100 for switching a displayed signal 102 for a display 104 between a plurality of signals according to one embodiment of the invention. As in a conventional television control system, a multiplexed signal 106 carrying any number of television channels, program variable signals 108 is provided. Multiplexed signal 106 may be provided via any now known or later developed manner, e.g., broadcast, cable, digital signal line (DSL), satellite, etc. A descrambler 110 may be provided, where necessary, to decode an encrypted multiplexed signal 106. Typically, a primary tuner 112 receives multiplexed signal 106 and allows a user to select a single television channel, program variable signal 108 (hereinafter "TV channel signal") for display on display 104. Each TV channel signal 108 may alternately carry program material and non-program material. As used herein, "program material" may include a main line up of material such as a situational comedy, sports activity, news, documentary, etc., and "non-program material" may include any other subject matter not part of the program material, e.g., commercials, public address announcements, etc. For example, the Discovery Channel signal typically carries program material in the form of documentary-type shows interspersed with non-program material commercials, and the ESPN signal typically carries program material in the form of sports activities interspersed with non-program material commercials.

Switching system 100 includes a microcontroller 130 including an associated memory 132, a monitor tuner 134, a state detector 136, a timer 138 and a signal selector 140. Switching system 100 may also include a chooser 144 (e.g., a register) for choosing a signal 108 as a primary signal (or a primary TV channel signal) from plurality of program variable signals 108. As used herein, "a primary signal" (or "primary TV channel signal") is a signal to be monitored during switching to other, secondary signal(s) 120 so that display 104 can return to the primary signal when a predetermined condition is met, e.g., program material returns after a commercial ends or program material begins after a commercial. As used herein, a "secondary signal" 120 can be any now known or later developed signal for displaying matter on display 104. In one embodiment, secondary signal may include one or more of the following: a television channel signal, a gaming device signal, a computer subsystem signal, and any video-in signal such as those from a VCR, DVD player, video camera, etc. The functionality of the above-described structure will be described below.

Primary tuner 112 and switching system 100 may be controlled via a remote control 114. Remote control 114 may include additional features to tie into switching system 100 function, such as a two way transmit/receiver 116 so that informational feedback of the current state of switching system 100 is available. However, the two way function is not a requirement for switching system 100 to function. According to one embodiment of the invention, primary tuner 112 and switching system 100 receive multiplexed signal 106. Switching system 100 also receives any number of secondary signals 120, as will be described below. Microcontroller 130 may include a radio frequency (RF) receiving function 150 so that functions of remote control 114 can be received and decoded.

Figure 2:
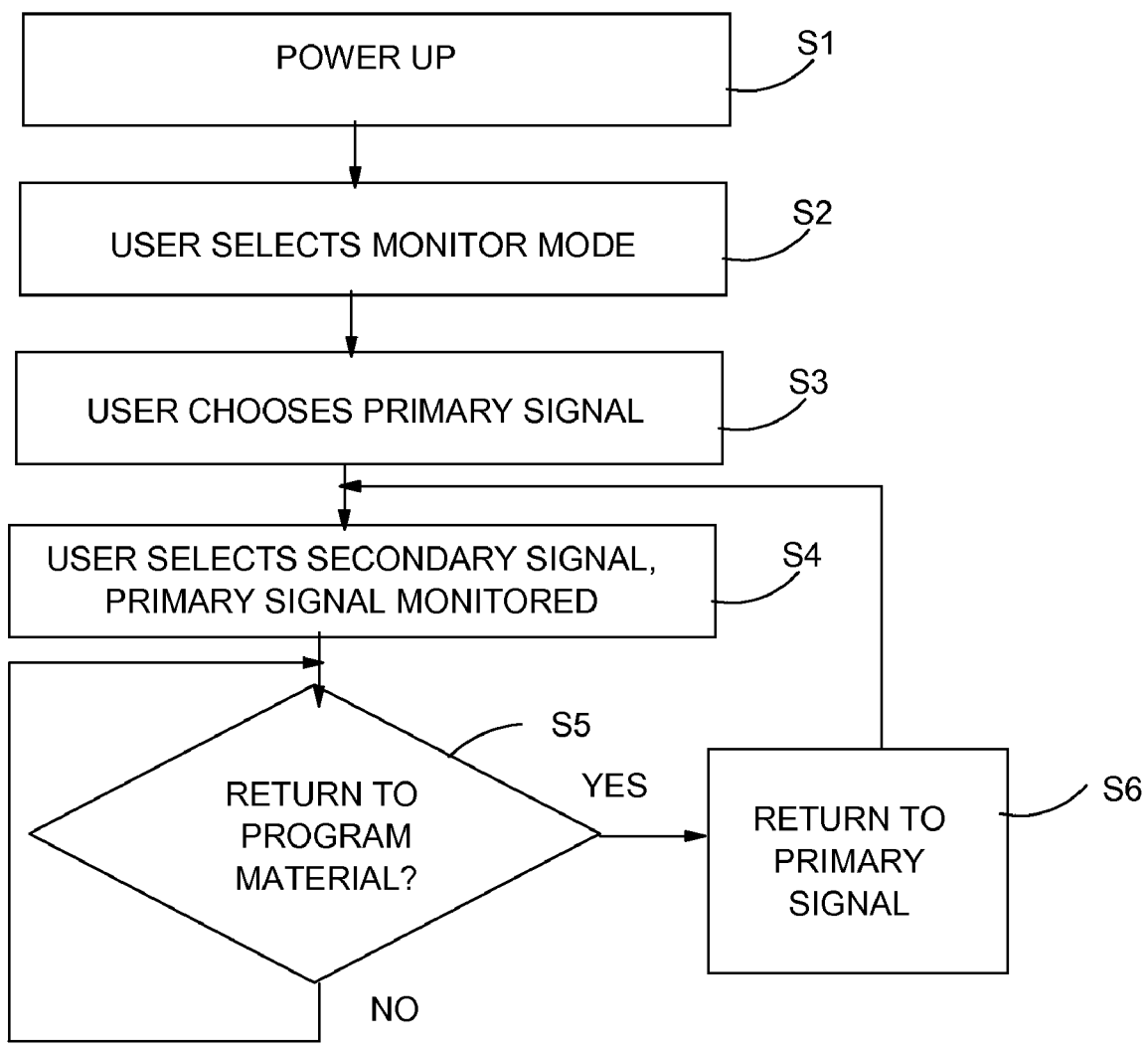
FIG. 2 shows a flow diagram of one embodiment of an operational methodology according to the invention.

Turning to FIG. 2, one embodiment of an operational methodology according to the invention will now be described.

In a first step S1, switching system 100, display 104 and primary tuner 112 are powered up. At this step, microcontroller 130 clears and sets state detector 136 to an inactive state, and locks monitor tuner 134 to the same incoming signal 152 as primary tuner 112. That is, microcontroller 130 instructs selector 140 to pass incoming signal 152 from primary tuner 112 to display 104. As will be described below, selector 140 is also coupled to microcontroller 130 for switching displayed signal 102 from secondary signal 120 to primary signal 154 upon return of primary signal 154 to the program material. If a user does not enter the active, monitor mode for switching system 100, switching system 100 will remain in the inactive state and is transparent to primary tuner 112 function.

However, if the user selects the active, monitor mode at step S2, then microcontroller 130 will override an incoming signal 152 from primary tuner 112 so that switching system 100 can be programmed by the user. In this case, microcontroller 130 will lock monitor tuner 134 to a user-chosen primary signal 154. Monitor tuner 134 is coupled to microcontroller 130 for tuning primary signal 154 during switching of displayed signal 102 to secondary signal 120. Switching to secondary signal may occur where primary signal 154 is carrying the non-program material, as will be described in more detail below. In one embodiment, a digital feedback (not shown) of primary tuner 112 and monitor tuner 134 may be included so that microcontroller 130 can detect if primary tuner 112 and secondary tuner 134 are tuned to different signals.

Next, at step S3, a user chooses primary signal 154. This step can be carried out in any now known or later developed fashion. For example, the step can be accomplished via a rapid program mode, by selecting a choose button on remote control 114, which will cause the current signal to be selected as primary signal 154. In an alternative embodiment, microcontroller 130 may choose a primary signal 154 simply by a history of the keyboard selection from remote control 114. In another alternative embodiment, upon power up, a default signal of primary tuner 112 could be chosen as primary signal 154, or if a non volatile memory exists, then the last chosen signal 112 could be the chosen primary signal 154. In any event, primary signal 154 selection may be registered via chooser 144. Chooser 144 can be implemented as a memory 132 scratch space, or since the number potential input signals is typically less than 10, could be an internal general purpose register to microcontroller 130. Prior to primary signal selection, each time the user selects a different signal, e.g., via remote control 114, then microcontroller 130 will instruct selector 140 to select the selected input signal and route it to display 104. Once a primary signal 154 is chosen, microcontroller 130 instructs monitor tuner 134 to remain tuned to primary signal 154, i.e., monitor it. Primary tuner 112 and monitor tuner 134 are both tuned to primary signal 154 at this stage.

In step S4, a user selects a different secondary signal 120 from primary signal 154, e.g., using remote control 114 to control primary tuner 112. Selector 140 passes secondary signal 120 to display 104. A user may select a different secondary signal 120 for a variety of reasons, most notably, primary signal 154 carrying non-programming material that the user does not want to watch. As noted above, secondary signal 120 may include any now known or later developed signal for displaying matter on display 104. For example, secondary signal 120 may include one or more of the following: a television channel signal, a gaming device signal, a computer subsystem signal, and any video-in signal such as those from a VCR, DVD player, video camera, etc. In addition, it should be recognized that the user could sequentially select more than one secondary signal 120, e.g., channel surfing. If the user selects a different television channel signal at this stage, selector 140 selects incoming signal 152 from primary tuner 112 as the secondary signal 120. That is, primary tuner 112 is tuned to secondary signal 120 (incoming signal 152) while monitor tuner 134 remains tuned to primary signal 154. If the user selects a non-television channel signal, then selector 140 selects the secondary signal 120 from an input other than primary tuner 112, e.g., a video-in input. When a secondary signal 120 is selected, step S4, microcontroller 130 also sets state detector 136 to monitor mode to detect a return of primary signal 154 to the program material. State detector 136 is coupled to monitor tuner 134.

Figure 3:
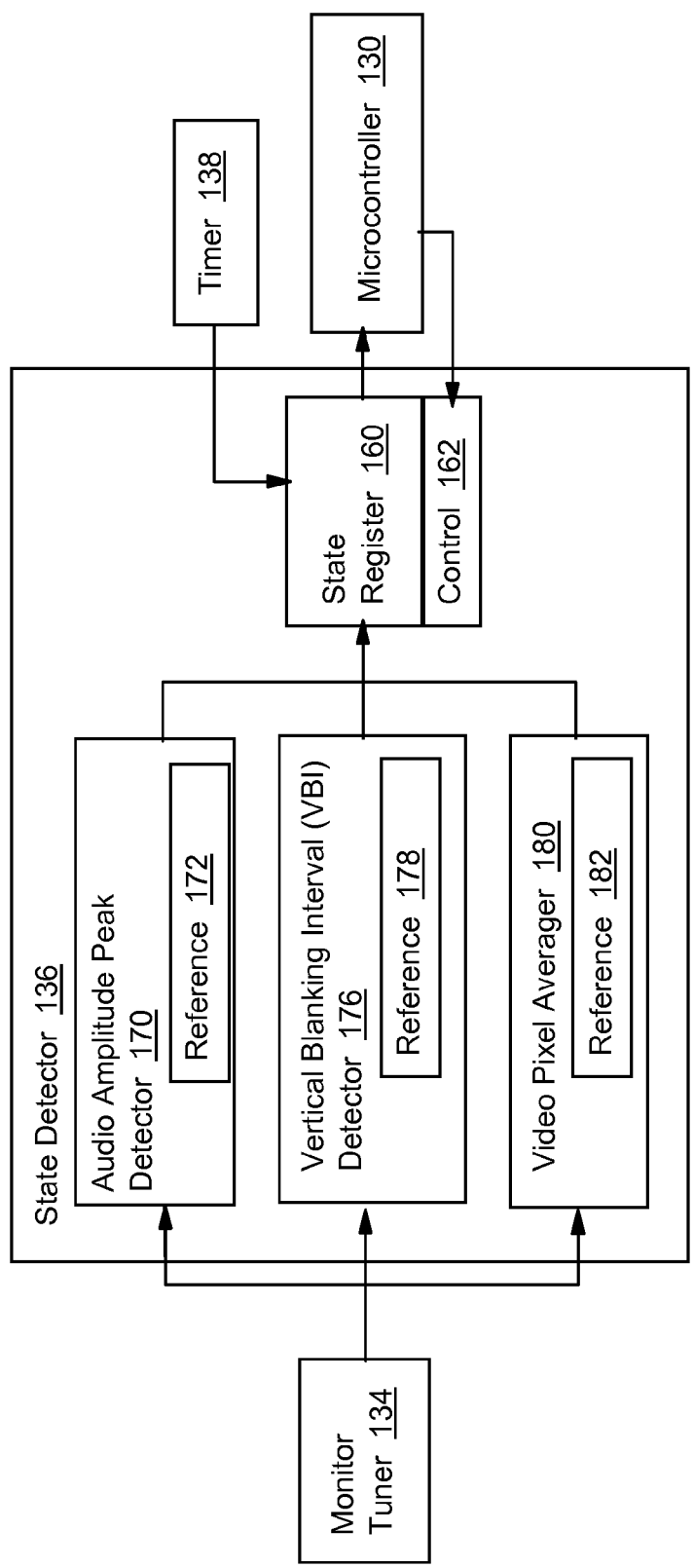
FIG. 3 shows a block diagram of one embodiment of a state detector of the invention.

At step S5, state detector detects a return of primary signal 154 to program material. FIG. 3 shows a block diagram of one embodiment of state detector 136. In one embodiment, microcontroller 130 sets state register 160 control 162 (FIG. 3) of state detector 136 to monitor mode to detect program material return on primary signal 154. State detector 136 may detect program material return on primary signal 154 in a number of ways, as will be described below.

Once state detector 136 indicates a return is warranted, i.e., YES at step S5, then at step S6, microcontroller 130 instructs selector 140 to override primary tuner 112, and return to primary signal 154. Selector 140 is coupled to microcontroller 130 for switching displayed signal 102 from secondary signal 120 to primary signal 154 upon return of primary signal 154 to the program material. State detector 136 may indicate a return to program material to microcontroller 130 in a number of ways. In one embodiment, state detector 136 may interrupt microcontroller 130. In an alternative embodiment, microcontroller 130 may periodically poll state register 160 of state detector 136 (FIG. 3). In an alternative embodiment, microcontroller 130 may also provide an approval query to a user prior to initiating the switch to primary signal 154, rather than automatically return to primary signal 154. For example, a transmit device in microcontroller 130 may transmit a signal to remote control 114 to activate some sort of notification thereon (e.g., flashing light, vibration, etc.), or microcontroller 130 may cause display of a notification on display 104 that program material has returned on primary signal 154, and then allow a user to choose to return. The switching may occur automatically, or as will be described, a user may be queried for approval.

Returning to step S5 (FIG. 2), as shown in FIG. 3, state detector 136 may include a number of different mechanisms to detect a return of primary signal 154 to the program material. In any event, state detector 136 detects a predetermined condition indicative of a return of primary signal 154 to program material, e.g., a boundary condition in program content. In one embodiment, the predetermined condition includes at least one of the following: a change in an audio amplitude peak, a vertical blanking interval occurrence, a change in a video pixel average and a predetermined time lapse. To this extent, in one embodiment, state detector may include one or more of the following: an audio amplitude peak detector 170 including a reference 172, a vertical blanking interval (VBI) detector 176 including a reference 178 and a video pixel averager 180 including a reference 182. In terms of a change in an audio amplitude peak, audio amplitude peak detector 170 can detect a change in amplitude versus reference 172, which indicates a return to program material. For example, typically when non-program material is carried by a signal, a program material boundary condition is created because the amplitude of the audio signal is increased for an increase in the output volume for the non-programming material. Hence, a decrease in audio amplitude may indicate a return to program material. In this case, audio amplitude detector 170 changes state register 160 to indicate a program material condition of primary signal 154, resulting in a return to primary signal 154 at step S6, as described above. In another embodiment, a vertical blanking interval (VBI) can be detected by VBI detector 176. A "vertical blanking interval" is a gap between material content in a signal, which is typically indiscernible to the naked eye. VBI detector 176, perhaps using a reference 178, detects a boundary condition in program material versus the non-program material. Similar to the audio amplitude peak detector 170, the VBI detection would be indicated in state register 160 to indicate a return to program material. In another embodiment, video pixel averager 180 averages an active video pixel number, which can be used to detect a change in active video pixels compared to a reference 182 that can indicate a return to program material.

In yet another embodiment, timer 138 is input to state register 160. In this case, if none of the above three illustrative detection mechanisms detect a return to program material, a predetermined time lapse may be used to indicate a likely return to program material. That is, the non-return will time out and state register 160 will indicate a return to program material. An alternative to this detection mechanism may be utilization of a pre-determined primary signal entry. For example, even though no primary channel has been chosen, timer 138 may indicate a return (change) to a particular signal when a particular program is to begin.

In addition to the above-described predetermined conditions indicating a return to primary signal 154, selector 140 may provide an approval query to a user prior to initiating the switch to the primary signal, as described above. That is, the predetermined condition may also include the user indicating a choice to return.

The above-described embodiments provide a user with the ability to switch signals (e.g., TV channels) and monitor the state of the monitored, primary signal 154. During non-program material, the user can then change to a secondary signal 120 (e.g., other signals (channels) on primary tuner 112), knowing that upon return to the primary signal's program material, primary tuner 112 will be switched back to primary signal 154, and little or no program material would be missed during the time that primary tuner 112 has been switched.

The above-described embodiments may also be applied to detect when program material begins. For example, the predetermined condition may be the end of a commercial indicated by a reduction in audio amplitude, which represents the start of program material.

It is understood that the order of the above-described steps is only illustrative. To this extent, one or more steps can be performed in parallel, in a different order, at a remote time, etc. Further, one or more of the steps may not be performed in various embodiments of the invention.

While shown and described herein as a system for switching a displayed signal for a display between a plurality of signals, it is understood that the invention further provides various alternative embodiments. For example, in one embodiment, the invention provides a computer-readable medium that includes computer program code to enable a computer infrastructure to switch a displayed signal for a display between a plurality of signals. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 132 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to switch a displayed signal for a display between a plurality of signals, as described above. In this case, the service provider can manage (e.g., create, maintain, support, etc.) a computer infrastructure that allows a customer to perform the process steps of the invention. In return, the service provider can receive payment from the customer(s) under a subscription and/or fee agreement and/or the service provider can receive payment from the sale of advertising space to one or more third parties.

In still another embodiment, the invention provides a method of generating a system for switching a displayed signal for a display between a plurality of signals. In this case, a computer infrastructure, such as switching system 100 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A system for switching a displayed signal for a display between a plurality of signals, the system comprising:
    a microcontroller;
    a chooser for setting a primary signal from a plurality of program-variable signals;
    a monitor tuner coupled to the microcontroller for tuning the primary signal during switching of the displayed signal from the primary signal to a secondary signal;
    a detector coupled to the monitor tuner and the microcontroller for detecting a predetermined condition in the primary signal; and
    a selector coupled to the microcontroller for switching the displayed signal from the secondary signal to the primary signal upon occurrence of the predetermined condition,
    wherein the microcontroller is configured to:
        transmit a signal initiating a visible notification on either a remote control or a display coupled to the monitor tuner, and
        transmit a signal initiating a visible approval query on the display, the visible approval query allowing a user to choose whether to switch the displayed signal from the secondary signal to the primary signal.

2. The system of claim 1, wherein the predetermined condition includes at least one of the following: a change in an audio amplitude peak, a vertical blanking interval occurrence, a change in a video pixel average and a predetermined time lapse.

3. The system of claim 1, wherein the remote control includes a two-way transmitter/receiver.

4. The system of claim 1, wherein the primary signal is a television channel signal.

5. The system of claim 1, wherein the secondary signal is one of: a television channel signal, a gaming device signal, a video-in signal and a computer subsystem signal.

6. The system of claim 1, wherein the monitor tuner tunes the primary signal during switching of the displayed signal from the primary signal to a plurality of different secondary signals.

7. The system of claim 1, further comprising a primary tuner for tuning the primary signal during a period when the displayed signal is not switched to the secondary signal.

8. The system of claim 1, wherein, in the case that the visible notification is initiated on the remote control, the visible notification includes a flashing light.

9. A system for switching a displayed signal for a display between a plurality of signals, the system comprising:
    a microcontroller;
    a chooser for choosing a signal as a primary television (TV) channel signal from a plurality of TV channel signals at the microcontroller, the primary TV channel signal carrying one of a program material and a non-program material;
    a monitor tuner coupled to the microcontroller for tuning the primary TV channel signal during switching of the displayed signal to a secondary signal in the case that the primary TV channel signal is carrying the non-program material;
    a detector coupled to the monitor tuner for detecting a return of the primary TV channel signal to the program material, wherein, in response to the detecting, the microcontroller is configured to:
        transmit a signal initiating a visible notification on either a remote control or a display coupled to the monitor tuner, and
        transmit a signal initiating a visible approval query on the display, the visible approval query allowing a user to choose whether to switch the displayed signal from the secondary signal to the primary TV channel signal; and a selector coupled to the microcontroller for switching the displayed signal from the secondary signal to the primary TV channel signal in response to the user choosing to switch the displayed signal from the secondary signal to the primary TV channel signal.

10. The system of claim 9, wherein the return is detected by at least one of the following: a change in an audio amplitude peak, a vertical blanking interval occurrence, a change in a video pixel average and a predetermined time lapse.

11. The system of claim 9, wherein the remote control includes a two-way transmitter/receiver.

12. The system of claim 9, wherein the secondary signal is one of: a television channel signal, a gaming device signal, a video-in signal and a computer subsystem signal.

13. The system of claim 9, wherein the monitor tuner tunes the primary TV channel signal during switching of the displayed signal from the primary TV channel signal to a plurality of different secondary signals.

14. The system of claim 9, further comprising a primary tuner for tuning the primary TV channel signal during a period when the displayed signal is not switched to the secondary signal.

15. The system of claim 9, wherein, in response to the detecting, the microcontroller is further configured to transmit a signal initiating a vibration notification to the remote control.

16. A system for switching a displayed signal for a display between a plurality of signals, the system comprising:

a microcontroller;

a chooser for choosing a signal as a primary television (TV) channel signal from a plurality of TV channel signals at the microcontroller, the primary TV channel signal carrying one of a program material and a non-program material;

a monitor tuner coupled to the microcontroller for tuning the primary TV channel signal during a period when a displayed signal is switched to a secondary signal in the case that the primary TV channel signal is carrying the non-program material;

a primary tuner for tuning the primary television channel signal during a period when the displayed signal is not switched to the secondary signal;

a detector coupled to the monitor tuner for detecting a return of the primary TV channel signal to the program material by at least one of the following: a change in an audio amplitude peak, a vertical blanking interval occurrence, a change in a video pixel average and a predetermined time lapse, wherein, in response to the detecting, the microcontroller is configured to:

transmit a signal initiating a visible notification on either a remote control or a display coupled to the monitor tuner, and transmit a signal initiating a visible approval query on the display, the visible approval query allowing a user to choose whether to switch the displayed signal from the secondary signal to the primary TV channel signal; and a selector coupled to the microcontroller for switching the displayed signal from the secondary signal to the primary TV channel signal in response to the user choosing to switch the displayed signal from the secondary signal to the primary TV channel signal.

17. The system of claim 16, wherein the chooser and the selector are controlled via a remote control.

18. The system of claim 16, wherein the secondary signal is one of: a television channel signal, a gaming device signal, a video-in signal and a computer subsystem signal.

19. The system of claim 16, wherein the monitor tuner tunes the primary TV channel signal during switching of the displayed signal from the primary TV channel signal to a plurality of different secondary signals.

20. The system of claim 16, wherein, in the case that the visible notification is initiated on the remote control, the visible notification includes a flashing light; and wherein, in response to the detecting, the microcontroller is further configured to transmit a signal initiating a vibration notification to the remote control.

* * * * *